United States Patent
Zong et al.

(10) Patent No.: US 10,560,186 B2
(45) Date of Patent: Feb. 11, 2020

(54) OPTICAL POWER EQUILIBRIUM METHOD AND APPARATUS

(71) Applicant: HUAWEI TECHNOLOGIES CO., LTD., Shenzhen (CN)

(72) Inventors: Liangjia Zong, Dongguan (CN); Han Zhao, Dongguan (CN); Zhiyong Feng, Dongguan (CN); Yunfei Yan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/378,527

(22) Filed: Apr. 8, 2019

(65) Prior Publication Data

US 2019/0238223 A1  Aug. 1, 2019

Related U.S. Application Data

(63) Continuation of application No. PCT/CN2016/101502, filed on Oct. 8, 2016.

(51) Int. Cl.
*H04B 10/079* (2013.01)
*H04B 10/548* (2013.01)
*H04J 14/02* (2006.01)

(52) U.S. Cl.
CPC ..... *H04B 10/07955* (2013.01); *H04B 10/548* (2013.01); *H04J 14/0212* (2013.01); *H04J 14/0221* (2013.01)

(58) Field of Classification Search
CPC ............. H04B 10/07955; H04B 10/548; H04J 14/0212; H04J 14/0221

(Continued)

(56) References Cited

U.S. PATENT DOCUMENTS 7,457,547 B2  11/2008  Frisken et al.
8,280,206 B2  10/2012  Hu et al.
(Continued)

FOREIGN PATENT DOCUMENTS

CN   1491510 A   4/2004
CN  102598707 A   7/2012
(Continued)

OTHER PUBLICATIONS

Stephen Frisken et al, Technology and Applications of Liquid Crystal on Silicon (LCoS) in Telecommunications. Optical Fiber Telecommunications VIA, 2013, 34 pages.

*Primary Examiner* — Dalzid E Singh
(74) *Attorney, Agent, or Firm* — Kilpatrick Townsend & Stockton LLP

(57) ABSTRACT

The present invention discloses an optical power equilibrium method and apparatus. The method includes: configuring a liquid crystal on silicon LCOS as a blazed grating pattern whose phase periodically changes, where each period includes three grating segments, a pixel quantity in each period does not change, and a second grating segment is located between a first grating segment and a third grating segment; monitoring power of wavelength signals in a WDM signal, where the WDM signal includes a first wavelength signal; and reducing a phase modulation depth and a pixel quantity of the second grating segment in each period at a first location if power of the first wavelength signal is greater than preset target power, so that the power of the first wavelength signal is the same as the target power, where the first location is a location at which the first wavelength signal is incident to the LCOS.

8 Claims, 5 Drawing Sheets

(58) Field of Classification Search
USPC .......................................................... 398/34
See application file for complete search history.

(56) References Cited

U.S. PATENT DOCUMENTS

| | | | |
|---|---|---|---|
| 9,019,612 B2 | 4/2015 | Wagener | |
| 2006/0067611 A1 | 3/2006 | Frisken et al. | |
| 2010/0046944 A1* | 2/2010 | Wagener | H04J 14/02 |
| | | | 398/34 |
| 2011/0020013 A1 | 1/2011 | Griffin | |
| 2012/0281982 A1* | 11/2012 | Frisken | G02B 6/29313 |
| | | | 398/34 |
| 2013/0070320 A1 | 3/2013 | Holmes | |
| 2013/0272650 A1* | 10/2013 | Ishikawa | G02B 6/35 |
| | | | 385/17 |
| 2014/0016079 A1 | 1/2014 | Sakurai | |
| 2014/0023316 A1 | 1/2014 | McLaughlin | |
| 2014/0314405 A1 | 10/2014 | Zhang et al. | |
| 2014/0355985 A1* | 12/2014 | Chu | G02F 1/292 |
| | | | 398/49 |
| 2014/0363162 A1* | 12/2014 | Chu | B82Y 20/00 |
| | | | 398/49 |
| 2015/0037031 A1 | 2/2015 | You et al. | |
| 2015/0208144 A1 | 7/2015 | Holmes | |
| 2016/0316281 A1* | 10/2016 | Keyworth | H04J 14/0212 |

FOREIGN PATENT DOCUMENTS

| | | |
|---|---|---|
| CN | 102696194 A | 9/2012 |
| CN | 102879864 A | 1/2013 |
| CN | 103353633 A | 10/2013 |
| CN | 103281153 B | 1/2016 |

\* cited by examiner

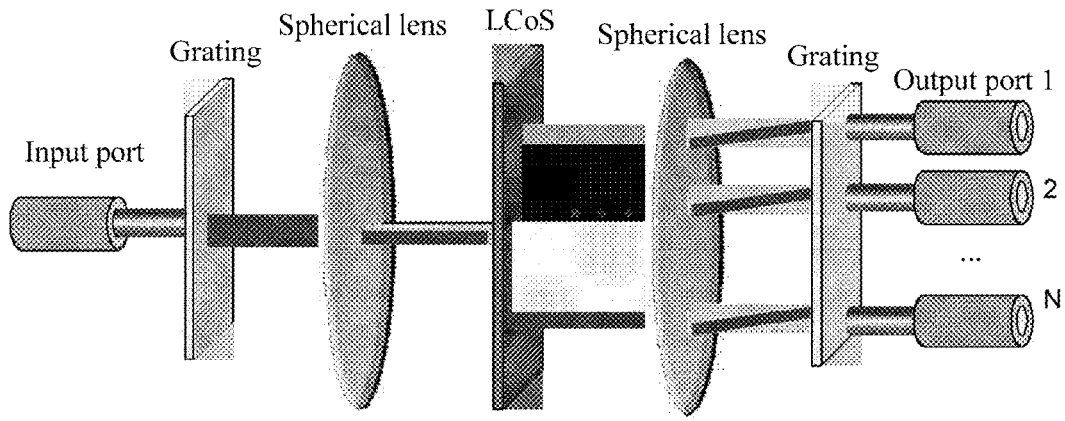

FIG. 1

Configure an LCOS as a blazed grating pattern whose phase periodically changes, where each period includes three grating segments, and a pixel quantity in each period is the same — 201

Monitor power of wavelength signals in a WDM signal, where the WDM signal includes a first wavelength signal — 202

Reduce a phase modulation depth and a pixel quantity of a second grating segment in each period at a first location if power of the first wavelength signal is greater than target power, to enable the power of the first wavelength signal to be the same as the target power — 203

FIG. 2

OPTICAL POWER EQUILIBRIUM METHOD AND APPARATUS

CROSS-REFERENCE TO RELATED APPLICATIONS

This application is a continuation of International Application No. PCT/CN2016/101502, filed on Oct. 8, 2016, the disclosure of which is hereby incorporated by reference in its entirety.

TECHNICAL FIELD

The present invention relates to the field of network communications technologies, and in particular, to an optical power equilibrium method and apparatus that are applicable to all optical cross devices that are based on a liquid crystal on silicon (LCOS).

BACKGROUND

With rapid increase of network traffic and bandwidth, operators have an increasingly urgent requirement for an intelligent scheduling function of a wavelength division network. Therefore, reconfigurable optical add/drop multiplexers (ROADM) are gradually used for networks of a growing quantity of high-end operators. After an ROADM is introduced onto a network, an operator can quickly provide a wavelength-level service, conveniently perform network planning, thereby reducing operation costs, and conveniently perform maintenance, thereby reducing maintenance costs.

On the other hand, on a long-haul optical transmission network, different gain or attenuation are generated on different channels (wavelengths) in a transmit band due to a plurality of reasons. Consequently, power values of wavelength signals are not equalized, thereby causing a variety of problems in network management. For example, excessively high signal power causes a larger nonlinear price, and excessively low signal power causes an excessively small optical signal-to-noise ratio (OSNR) of a signal at a receive end.

On an existing network, power equilibrium for wavelengths is usually implemented by using an optical cross device, particularly a wavelength selective switch (WSS), in each ROADM. It is assumed that, target power stipulated by a network system is 1 dB, and before wavelength signals enter an ROADM, power values of the wavelength signals are inconsistent. After wavelength signals pass through the WSS, the WSS may perform separate switching processing on the wavelength signals, and an insertion loss is additionally added to a wavelength signal whose power value is greater than 1 dB, thereby implementing optical power equilibrium for the wavelength signals. Attenuating the wavelength signal whose power value is greater than 1 dB by using phase control of a liquid crystal on silicon (LCOS) is a relatively common solution.

However, in this optical power equilibrium solution that is based on an LCOS, when a wavelength signal with high power is attenuated, power of a crosstalk signal generated in the LCOS by the wavelength signal is not reduced. Consequently, when optical power equilibrium is performed, a crosstalk feature of a port cannot satisfy a system requirement.

SUMMARY

Embodiments of the present invention provide an optical power equilibrium solution, resolving a problem that in an existing optical power equilibrium solution that is based on an LCOS, power of crosstalk signals generated in the LCOS by wavelength signals is not reduced, and a crosstalk feature of a port cannot satisfy a system requirement.

According to a first aspect, an optical power equilibrium method is provided, where the method is applicable to an optical cross device that is based on a liquid crystal on silicon LCOS, and after a wavelength division multiplexing WDM signal sent from an input port passes through an optical cross component, wavelength signals in the WDM signal are incident to different locations in the LCOS, where the method includes: configuring the LCOS as a blazed grating pattern whose phase periodically changes, where each period includes three grating segments, and a pixel quantity in each period does not change, where a second grating segment is located between a first grating segment and a third grating segment, and the second grating segment has only one phase variation rate at a same moment, and does not have a phase variation rate the same as both phase variation rates of the first grating segment and the third grating segment; monitoring power of the wavelength signals in the WDM signal, where the WDM signal includes a first wavelength signal; and reducing a phase modulation depth and a pixel quantity of the second grating segment in each period at a first location if power of the first wavelength signal is greater than preset target power, so that the power of the first wavelength signal is the same as the target power, where the first location is a location at which the first wavelength signal is incident to the LCOS.

According to a second aspect, an optical power equilibrium apparatus is provided. The apparatus includes an optical cross device and a monitor, the optical cross device includes an optical cross component and a liquid crystal on silicon LCOS, and the optical cross component is configured to enable wavelength signals in a wavelength division multiplexing WDM signal that passes through the optical cross component to be incident to different locations in the LCOS; the monitor is configured to: monitor power of the wavelength signals in the WDM signal, and send a monitoring result to the LCOS, where the WDM signal includes a first wavelength signal; the LCOS is configured as a blazed grating pattern whose phase periodically changes, where each period includes three grating segments, and a pixel quantity in each period does not change, where a second grating segment is located between a first grating segment and a third grating segment, and the second grating segment has only one phase variation rate at a same moment, and does not have a phase variation rate the same as both phase variation rates of the first grating segment and the third grating segment; and the LCOS reduces a phase modulation depth and a pixel quantity of the second grating segment in each period at a first location if power of the first wavelength signal is greater than preset target power, so that the power of the first wavelength signal is the same as the target power, where the first location is a location at which the first wavelength signal is incident to the LCOS.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 1 is a schematic diagram of a basic optical route principle of a 1×N WSS structure according to the prior art;

FIG. 2 is a schematic flowchart of an optical power equilibrium method according to an embodiment of the present invention;

DESCRIPTION OF EMBODIMENTS

Figure 3:
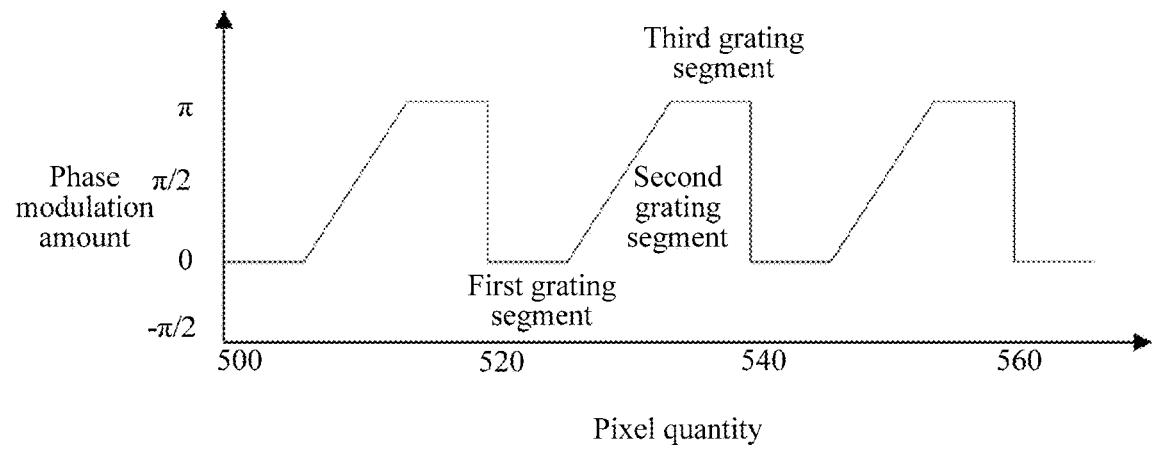
FIG. 3 is a schematic diagram of LCOS phase distribution according to an embodiment of the present invention.

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

In the following description, to illustrate rather than limit, specific details such as a particular system structure, an interface, and a technology are provided to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

When the embodiments of the present invention mention an ordinal such as "first" or "second", the ordinal should be understood as only serving a purpose of distinguishing, unless the ordinal definitely expresses a meaning of sequence based on context.

The embodiments of the present invention are implemented based on an optical cross device, but there are a variety of optical cross devices. For the ease of understanding, in the embodiments of the present invention, a working principle of the optical cross devices is described in detail by using a very widely applied optical cross device, namely, a WSS, as an example.

Using a 1×N WSS as an example, a basic optical route principle of this structure is shown in FIG. 1. After passing through an optical fiber array (including a collimation lens), a wavelength division multiplexing (WDM) signal enters an incident grating. The WDM signal includes a plurality of signals for different wavelengths, namely, a plurality of wavelength signals. The incident grating enables the plurality of wavelength signals to be emitted to a spherical lens in different diffraction angles. After passing through the spherical lens, the plurality of wavelength signals are incident to different locations in an LCOS in parallel. Then, phase code modulation is performed in the LCOS based on emergent ports of different wavelength signals, to output light with different wavelengths in different angles. Next, the wavelength signals successively pass through the spherical lens and an output grating, to output signals from different output ports. An optical route principle of an N×M WSS structure is the same as that of the 1×N WSS. Details are not described herein again.

For ease of understanding by a person skilled in the art, in the present invention, the technical solutions provided in the present invention are described by using the following embodiments.

As shown in FIG. 2, an embodiment of the present invention provides an optical power equilibrium method. The method is applicable to an optical cross device that is based on an LCOS, and after a WDM signal emitted from an input port passes through an optical cross component, wavelength signals in the WDM signal are incident to different locations in the LCOS. The method specifically includes the following steps.

201: Configure the LCOS as a blazed grating pattern whose phase periodically changes, where each period includes three grating segments, and a pixel quantity in each period does not change.

Specifically, the LCOS includes many pixels, each grating segment includes some pixels, and a respective phase may be configured for each pixel, in other words, a respective phase modulation amount may be configured for each pixel. Therefore, the pixel in the LCOS is configured as a form in which the phase modulation amount periodically changes, so that the LCOS may have a function of a blazed grating. Among all pixels included in a grating segment, a maximum difference between phase modulation amounts is a phase modulation depth. For example, in a second grating segment, phase modulation amounts change from 0 to 2π, and then the phase modulation depth is 2π.

FIG. 3 shows a typical relationship between a phase modulation amount and a pixel quantity for three grating segments. It can be learned from the figure that, the second grating segment is located between a first grating segment and a third grating segment, and the second grating segment has only one phase variation rate at a same moment. Correspondingly, in the figure, the second grating segment has only one slope at a same moment. Herein, it should be noted that, the slope of the second grating segment may be the same as a slope of the first grating segment, or may be the same as a slope of the third grating segment, but cannot be the same as both slopes of the first grating segment and the third grating segment.

It should be understood that, FIG. 3 shows only the typical relationship between the phase modulation amount and the pixel quantity for the three grating segments. There may be another relationship between the phase modulation amount and the pixel quantity for the three grating segments. For example, a phase modulation amount of the first grating segment is greater than a phase modulation amount of the third grating segment, a slope of the first grating segment or the third grating segment is not 0, and so on. This is not limited in this embodiment of the present invention.

202: Monitor power of the wavelength signals in the WDM signal, where the WDM signal includes a first wavelength signal.

203: Reduce a phase modulation depth and a pixel quantity of a second grating segment in each period at a first location if power of the first wavelength signal is greater than preset target power, so that the power of the first wavelength signal is the same as the target power.

The first location is a location at which the first wavelength signal is incident to the LCOS.

Figure 4:
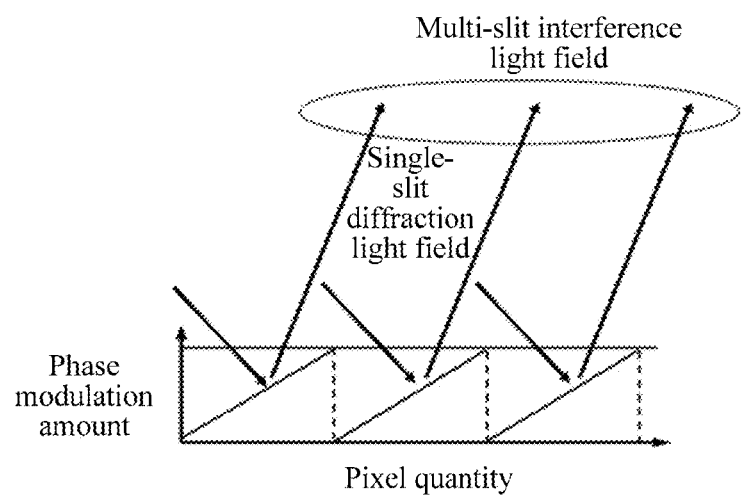
FIG. 4 is a schematic structural composition diagram of a light field when an LCOS is configured as a blazed grating whose phase periodically changes.
Figure 5:
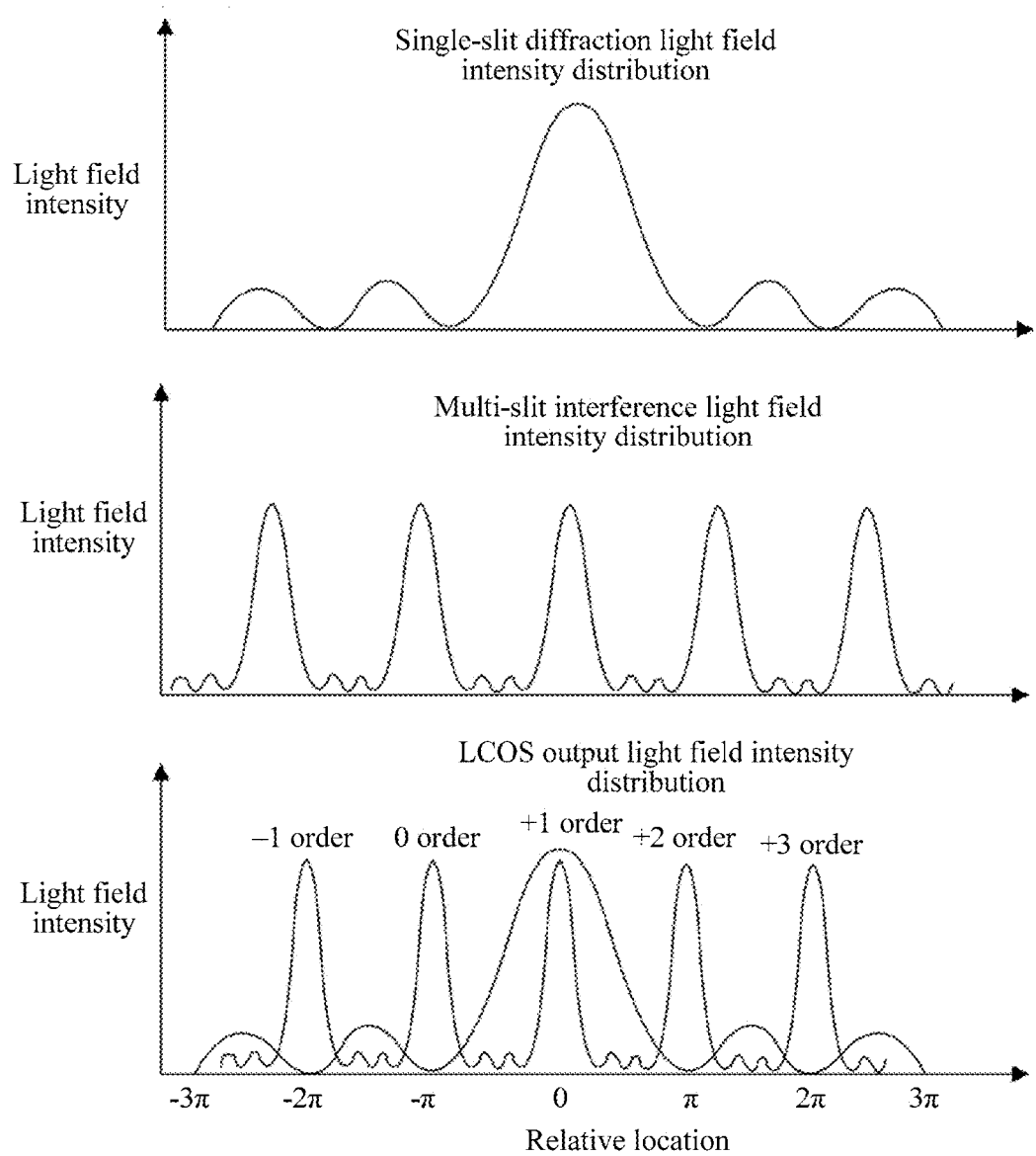
FIG. 5 is a light field distribution diagram when a phase in each period of an LCOS changes from 0 to 2π.

Specifically, if the power of the first wavelength signal is greater than the target power, the first wavelength signal needs to be attenuated. In this embodiment of the present invention, a manner of reducing the phase modulation depth and the pixel quantity of the second grating segment in each period at the first location is used. A principle thereof is as follows:

When a phase that periodically changes is loaded in the LCOS, final diffraction field distribution includes two parts, and as shown in FIG. 4, includes a single-slit diffraction light field formed in each period and a multi-slit interference light field formed between a plurality of periods, and signal light that is output is a product effect of the two parts. FIG. 5 is a light field distribution diagram when a phase in each period changes from 0 to 2π. It can be learned from the figure that, during adjustment without attenuation (the phase modulation depth is 2π), a peak value of single-slit diffraction is exactly aligned with a peak value of +1 order light of multi-slit interference. In this case, signal light (the +1 order light) that is output is the maximum. In addition, a peak value of another-interference-order light (such as −2 order, −1 order, or +2 order light) is aligned with a "0" point of the single-slit diffraction. Therefore, another-order diffractive light in this scenario reaches the minimum. When the signal light (the +1 order light) needs to be attenuated, the phase modulation depth of the LCOS is reduced, in other words, a phase in a period changes from 0 to A (0<A<2π). In this case, light field distribution of the single-slit diffraction is moved, and the peak value of the +1 order light is no longer aligned with a peak value of single-slit diffractive light. Therefore, energy of the +1 order light is reduced. However, in this case, light field of the another-interference-order light is no longer aligned with the "0" point of the single-slit diffraction either. Therefore, energy of crosstalk light formed by the another-interference-order light is also increased. Consequently, a power difference between the signal light and the crosstalk light may not satisfy a system requirement.

Figure 6:
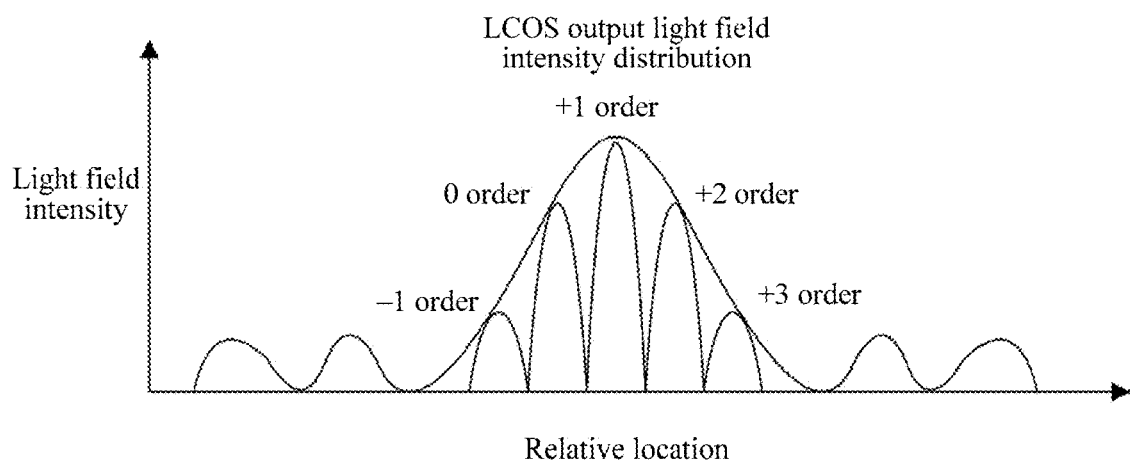
FIG. 6 is a light field distribution diagram when a phase in each period of an LCOS changes from 0 to 2π after envelope broadening.

In this embodiment of the present invention, on the basis of reducing the phase modulation depth of the LCOS, the pixel quantity of the second grating segment is also reduced. In addition, the pixel quantity in each period does not change. This plays a role of broadening an envelope of the single-slit diffraction light field. After the envelope is broadened, the envelope includes light fields of light of a plurality of orders. As shown in FIG. 6, when reduction of the phase modulation depth of the LCOS causes the envelope to be moved to the left, power of the +1 order light is correspondingly reduced, and power of the +2 order light and power of +3 order light are also correspondingly reduced, thereby implementing synchronous reduction of signal power and crosstalk power, so that it can be ensured that the power difference between the signal light and the crosstalk light satisfies the system requirement.

Specifically, a specific solution in this embodiment of the present invention may be: determining, based on the power of the first wavelength signal, a plurality of groups of phase modulation depths and pixel quantities that satisfy a requirement, where a condition for satisfying the requirement is that the power of the first wavelength signal is the same as the target power; and monitoring a power value of a crosstalk signal generated by the first wavelength signal, using one group of a phase modulation depth and a pixel quantity that satisfy the requirement and that make power of the crosstalk signal to be the minimum as a target phase modulation depth and a target pixel quantity, and respectively reducing the phase modulation depth and the pixel quantity of the second grating segment in each period at the first location to the target phase modulation depth and the target pixel quantity.

Due to the envelope broadening, peak power of the envelope is correspondingly reduced, thereby reducing power of the signal light. The +1 order light is not aligned with the peak value of the single-slit diffractive light, also playing a role of power attenuation. In other words, the reduction of either the phase modulation depth or the pixel quantity of the second grating segment may reduce the power of the signal light. Therefore, there are the plurality of groups of phase modulation depths and pixel quantities that may enable the power of the signal light to be attenuated to be the same as the target power. In this embodiment of the present invention, the one group of a phase modulation depth and a pixel quantity that make the crosstalk power to be the minimum is selected from the plurality of groups of phase modulation depths and pixel quantities that satisfy the requirement.

Figure 7:
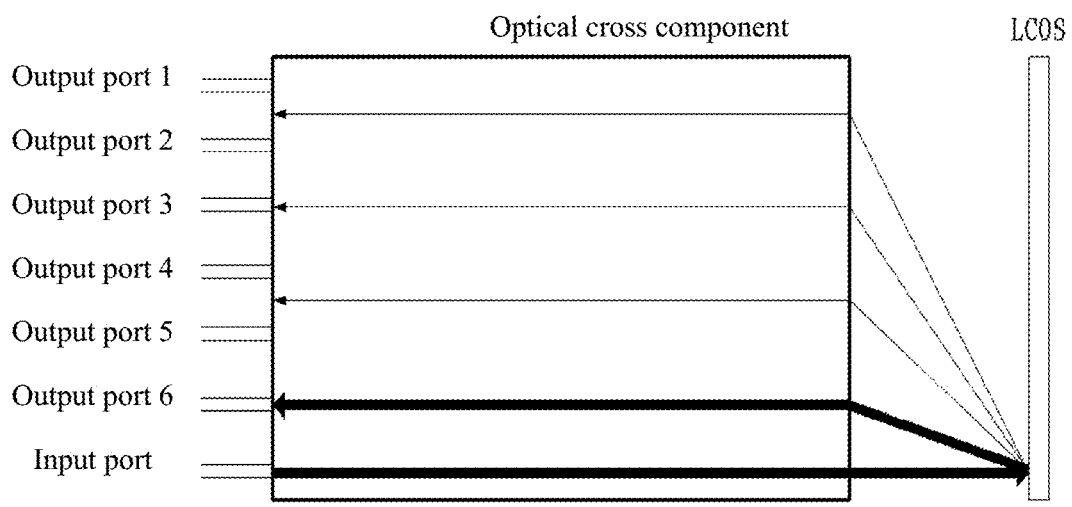
FIG. 7 is a schematic structural diagram of an applicable optical cross device according to an embodiment of the present invention.

It should be noted that, in this embodiment of the present invention, attenuation of +2 order and +3 order light on a single side of the +1 order light can be implemented, but energy of −1 order, −2 order, and −3 order light on the other side is still increased. Therefore, this embodiment of the present invention may be applicable to an optical cross device on which output ports are arranged on a single side. A schematic structural diagram of the optical cross device is shown in FIG. 7.

Further, when a solution of reducing the phase modulation depth and the pixel quantity of the second grating segment in each period at the first location in the LCOS is used, phase modulation amounts of all pixels in the first grating segment need to be kept the same, and phase modulation amounts of all pixels in the third grating segment also need to be kept the same. In this case, when the +1 order light is attenuated to be the same as the target power, compared with the foregoing embodiment, the power of the +2 order light and the power of the +3 order light are reduced more, in other words, the crosstalk power is reduced more, and isolation between ports is better. This characteristic is recorded as a characteristic 1.

In addition, when the solution of reducing the phase modulation depth and the pixel quantity of the second grating segment in each period at the first location in the LCOS is used, keeping a pixel quantity of the first grating segment the same as a pixel quantity of the third grating segment may also play a role of reducing the power of the +2 order light and the power of the +3 order light more and reducing the crosstalk power more. This characteristic is recorded as a characteristic 2. Alternatively, the characteristic 1 and the characteristic 2 may be combined, and applied together to the solution shown in FIG. 2, to achieve a better port isolation effect.

Figure 8:
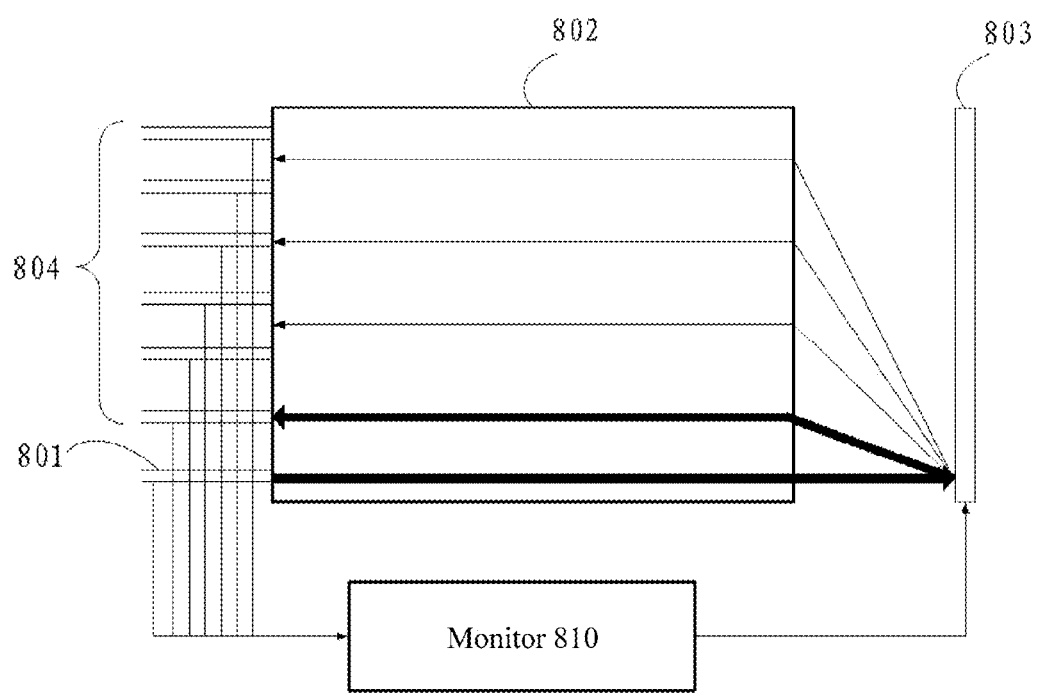
FIG. 8 is a schematic structural diagram of an optical power equilibrium apparatus according to an embodiment of the present invention.

Another embodiment of the present invention provides an optical power equilibrium apparatus. As shown in FIG. 8, the apparatus includes an optical cross device 800 and a monitor 810. The optical cross device 800 includes an input port 801, an optical cross component 802, an LCOS 803, and a plurality of output ports 804. The optical cross component 802 is configured to enable wavelength signals in a WDM signal that passes through the optical cross component 802 to be incident to different locations in the LCOS 803, where the monitor 810 is configured to: monitor power of the wavelength signals in the WDM signal, and send a monitoring result to the LCOS 803, where the WDM signal includes a first wavelength signal; and the LCOS 803 is configured as a blazed grating pattern whose phase periodically changes, where each period includes three grating segments, a second grating segment is located between a first grating segment and a third grating segment, and a pixel quantity in each period is the same; and the LCOS 803 reduces a phase modulation depth and a pixel quantity of the second grating segment in each period at a first location if power of the first wavelength signal is greater than target power, so that the power of the first wavelength signal is the same as the target power.

As shown in FIG. 3, the second grating segment has only one phase variation rate at a same moment, and does not have a phase variation rate the same as both phase variation rates of the first grating segment and the third grating segment; and the first location is a location at which the first wavelength signal is incident to the LCOS 803, and the target power is preset in a WDM system. A principle used by the apparatus provided in the present invention to attenuate power of signal light is already described in the foregoing embodiments. Details are not described herein again.

The monitor 810 is further configured to: monitor power of crosstalk signals generated by the wavelength signals, and send the power of the crosstalk signals to the LCOS 803; and a specific manner in which the LCOS 803 reduces the phase modulation depth and the pixel quantity of the second grating segment in each period at the first location is: determining, based on the power of the first wavelength signal, a plurality of groups of phase modulation depths and pixel quantities that satisfy a requirement, where a condition for satisfying the requirement is that the power of the first wavelength signal is the same as the target power; and using one group of a phase modulation depth and a pixel quantity that satisfy the requirement and that make the power of the crosstalk signals to be the minimum as a target phase modulation depth and a target pixel quantity, and respectively reducing the phase modulation depth and the pixel quantity of the second grating segment in each period at the first location to the target phase modulation depth and the target pixel quantity.

The reduction of the pixel quantity of the second grating segment broadens an envelope, and peak power of the broadened envelope is correspondingly reduced, thereby reducing the power of the signal light. The reduction of the phase modulation depth of the second grating segment causes +1 order light of multi-slit interference to be not aligned with a peak value of single-slit diffractive light, also playing a role of power attenuation. In other words, the reduction of either the phase modulation depth or the pixel quantity of the second grating segment may reduce the power of the signal light. Therefore, there are the plurality of groups of phase modulation depths and pixel quantities that may enable the power of the signal light to be attenuated to be the same as the target power. In this embodiment of the present invention, the one group of a phase modulation depth and a pixel quantity that have optimal performance, that is, the one group of a phase modulation depth and a pixel quantity that make the crosstalk power to be the minimum, is selected from the plurality of groups of phase modulation depths and pixel quantities.

Optionally, in another embodiment, when a solution of reducing the phase modulation depth and the pixel quantity of the second grating segment in each period at the first location is used for the LCOS 803, phase modulation amounts of all pixels in the first grating segment are kept the same, and phase modulation amounts of all pixels in the third grating segment are also kept the same. In this case, when the power of the first wavelength signal is attenuated to be the same as the target power, lower crosstalk power may be obtained. Further, when the solution of reducing the phase modulation depth and the pixel quantity of the second grating segment in each period at the first location is used, the LCOS 803 may further keep a pixel quantity of the first grating segment the same as a pixel quantity of the third grating segment, and may play a role of further reducing the crosstalk power.

The technical solutions in the foregoing embodiments of this application have at least the following technical effects or advantages:

When the method and the apparatus provided in the embodiments of the present invention are used, the power equilibrium of the optical cross device that is based on the LCOS can be implemented, the power of the crosstalk signal can be reduced, and the isolation between the ports is ensured. In addition, no extra hardware needs to be added, and no costs are increased. Moreover, the method and the apparatus provided in the embodiments of the present invention are applicable to all optical cross devices that are based on the LCOS, and have a relatively wide application range.

It should be understood that "one embodiment" or "an embodiment" mentioned in the whole specification means that particular characteristics, structures, or features related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. Sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. An optical power equilibrium method, wherein the method is applicable to an optical cross device that is based on a liquid crystal on silicon (LCOS), and after a wavelength division multiplexing (WDM) signal emitted from an input port passes through an optical cross component, wavelength signals in the WDM signal are incident to different locations in the LCOS, wherein the method comprises:

configuring the LCOS as a blazed grating pattern whose phase periodically changes, wherein each period comprises three grating segments, and a pixel quantity in each period does not change, wherein a second grating segment is located between a first grating segment and a third grating segment, and the second grating segment has only one phase variation rate at a same moment, and does not have a phase variation rate the same as both phase variation rates of the first grating segment and the third grating segment;

monitoring power of the wavelength signals in the WDM signal, wherein the WDM signal comprises a first wavelength signal; and reducing a phase modulation depth and a pixel quantity of the second grating segment in each period at a first location if power of the first wavelength signal is greater than preset target power, so that the power of the first wavelength signal is the same as the target power, wherein the first location is a location at which the first wavelength signal is incident to the LCOS.

2. The method according to claim 1, wherein phase modulation amounts of all pixels in the first grating segment are the same, and phase modulation amounts of all pixels in the third grating segment are the same.

3. The method according to claim 1, wherein a pixel quantity of the first grating segment and a pixel quantity of the third grating segment are the same.

4. The method according to any one of claim 1, wherein the reducing a phase modulation depth and a pixel quantity of the second grating segment in each period at a first location specifically comprises:

determining, based on the power of the first wavelength signal, a plurality of groups of phase modulation depths and pixel quantities that satisfy a requirement, wherein a condition for satisfying the requirement is that the power of the first wavelength signal is the same as the target power; and monitoring a power value of a crosstalk signal generated by the first wavelength signal, using one group of a phase modulation depth and a pixel quantity that satisfy the requirement and that make power of the crosstalk signal to be the minimum as a target phase modulation depth and a target pixel quantity, and respectively reducing the phase modulation depth and the pixel quantity of the second grating segment in each period at the first location to the target phase modulation depth and the target pixel quantity.

5. An optical power equilibrium apparatus, wherein the apparatus comprises an optical cross device and a monitor, the optical cross device comprises an optical cross component and a liquid crystal on silicon (LCOS), and the optical cross component is configured to enable wavelength signals in a wavelength division multiplexing (WDM) signal that passes through the optical cross component to be incident to different locations in the LCOS, wherein the monitor is configured to: monitor power of the wavelength signals in the WDM signal, and send a monitoring result to the LCOS, wherein the WDM signal comprises a first wavelength signal; and the LCOS is configured as a blazed grating pattern whose phase periodically changes, wherein each period comprises three grating segments, and a pixel quantity in each period does not change, wherein a second grating segment is located between a first grating segment and a third grating segment, and the second grating segment has only one phase variation rate at a same moment, and does not have a phase variation rate the same as both phase variation rates of the first grating segment and the third grating segment; and the LCOS reduces a phase modulation depth and a pixel quantity of the second grating segment in each period at a first location if power of the first wavelength signal is greater than preset target power, so that the power of the first wavelength signal is the same as the target power, wherein the first location is a location at which the first wavelength signal is incident to the LCOS.

6. The apparatus according to claim 5, wherein phase modulation amounts of all pixels in the first grating segment are the same, and phase modulation amounts of all pixels in the third grating segment are the same.

7. The apparatus according to claim 5, wherein a pixel quantity of the first grating segment and a pixel quantity of the third grating segment are the same.

8. The apparatus according to claim 5, wherein the monitor is further configured to: monitor power of crosstalk signals generated by the wavelength signals, and send the power of the crosstalk signals to the LCOS; and the LCOS reduces the phase modulation depth and the pixel quantity of the second grating segment in each period at the first location is specifically: determining, by the LCOS based on the power of the first wavelength signal, a plurality of groups of phase modulation depths and pixel quantities that satisfy a requirement, wherein a condition for satisfying the requirement is that the power of the first wavelength signal is the same as the target power; and using one group of a phase modulation depth and a pixel quantity that satisfy the requirement and that make the power of the crosstalk signals to be the minimum as a target phase modulation depth and a target pixel quantity, and respectively reducing the phase modulation depth and the pixel quantity of the second grating segment in each period at the first location to the target phase modulation depth and the target pixel quantity.

* * * * *